United States Patent
Lv et al.

(10) Patent No.: US 11,341,049 B2
(45) Date of Patent: May 24, 2022

(54) METHOD, APPARATUS, AND COMPUTER PROGRAM PRODUCT FOR MANAGING STORAGE SYSTEM

(71) Applicant: EMC IP Holding Company LLC, Hopkinton, MA (US)

(72) Inventors: Shuo Lv, Beijing (CN); Ming Zhang, Beijing (CN); Huan Chen, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 99 days.

(21) Appl. No.: 16/654,819

(22) Filed: Oct. 16, 2019

(65) Prior Publication Data
US 2020/0133852 A1   Apr. 30, 2020

(30) Foreign Application Priority Data
Oct. 29, 2018  (CN) .......................... 201811271611.4

(51) Int. Cl.
*G06F 12/00* (2006.01)
*G06F 12/06* (2006.01)

(52) U.S. Cl.
CPC .. *G06F 12/0646* (2013.01); *G06F 2212/1032* (2013.01); *G06F 2212/1044* (2013.01)

(58) Field of Classification Search
CPC ......... G06F 12/0646; G06F 2212/1032; G06F 2212/1044
See application file for complete search history.

(56) References Cited

U.S. PATENT DOCUMENTS

| | | | | |
|---|---|---|---|---|
| 7,865,761 | B1* | 1/2011 | Chilton | G06F 13/1668 714/2 |
| 8,365,023 | B2* | 1/2013 | Chiu | G06F 3/0689 714/700 |
| 9,652,160 | B1* | 5/2017 | Piszczek | G06F 3/0647 |
| 9,959,058 | B1 | 5/2018 | O'Brien et al. | |
| 10,339,021 | B2 | 7/2019 | Xu et al. | |

(Continued)

OTHER PUBLICATIONS

Differential RAID: Rethinking RAID for SSD Reliability Mahesh Balakrishnan, Asim Kadav, Vijayan Prabhakaran, Dahlia Malkhi. Microsoft Research Silicon Valley, Mountain View, CA, USA. University of Wisconsin, Madison, WI, USA. Apr. 13-16, 2010.*

(Continued)

*Primary Examiner* — David Yi
*Assistant Examiner* — Tahilba O Puche
(74) *Attorney, Agent, or Firm* — BainwoodHuang

(57) ABSTRACT

Techniques involve managing a storage system. A target storage device is selected from multiple storage devices associated with the storage system in response to respective wear degrees of the multiple storage devices being higher than a first predetermined threshold. Regarding multiple extents in the multiple storage devices, respective access loads of the multiple extents are determined. A source extent is selected from multiple extents residing on storage devices other than the target storage device, on the basis of the respective access loads of the multiple extents. Data in the source extent are moved to the target storage device. Various storage devices in a resource pool may be prevented from reaching the end of life at close times, and further data loss may be avoided.

20 Claims, 9 Drawing Sheets

(56) References Cited

U.S. PATENT DOCUMENTS

| | | |
|---|---|---|
| 10,365,845 B1 | 7/2019 | Foley et al. |
| 10,372,349 B2 | 8/2019 | Xu et al. |
| 10,402,091 B1 | 9/2019 | Vankamamidi et al. |
| 10,789,004 B2 | 9/2020 | Gao et al. |
| 10,921,990 B2 | 2/2021 | Zhang et al. |
| 10,976,967 B2 | 4/2021 | Kang et al. |
| 10,977,129 B2 | 4/2021 | Gao et al. |
| 2013/0179631 A1* | 7/2013 | Cepulis .............. G06Q 30/0631 711/103 |
| 2015/0378613 A1* | 12/2015 | Koseki ................. G06F 3/0619 711/103 |
| 2017/0147242 A1* | 5/2017 | Gong ................... G06F 3/0619 |
| 2019/0294346 A1* | 9/2019 | Barzik ................. G06F 3/0616 |

OTHER PUBLICATIONS

Optimizing RAID/SSD Controllers with Lifetime Extension for Flash-Based SSD Array. Lei Han . Jun. 19-20, 2018, Philadelphia, PA, USA.*

* cited by examiner

METHOD, APPARATUS, AND COMPUTER PROGRAM PRODUCT FOR MANAGING STORAGE SYSTEM

CROSS-REFERENCE TO RELATED APPLICATION

This application claims priority to Chinese Patent Application No. CN201811271611.4, on file at the China National Intellectual Property Administration (CNIPA), having a filing date of Oct. 29, 2018, and having "METHOD, APPARATUS, AND COMPUTER PROGRAM PRODUCT FOR MANAGING STORAGE SYSTEM" as a title, the contents and teachings of which are herein incorporated by reference in their entirety.

FIELD

Various implementations of the present disclosure generally relate to storage management, and more specifically, to a method, apparatus and computer program product for managing various storage devices in a resource pool of a storage system.

BACKGROUND

With the development of data storage techniques, various data storage devices now provide users with increasingly large data storage capacity, and their data access speed has been improved greatly. With the increase of data storage capacity, users also impose greater demands on data reliability and response time of storage systems. So far a variety of data storage systems based on Redundant Arrays of Independent Disks (RAID) have been developed to improve reliability of data. When one or more disks in a storage system fail(s), data in failed disk(s) can be recovered from other normal disk.

Mapped Redundant Array of Independent Disks (mapped RAID) has been developed so far. In the mapped RAID, a disk is a logical concept and may include multiple extents. Multiple extents comprised in one logical disk may be distributed over different physical storage devices in a resource pool. Regarding multiple extents in one stripe of the mapped RAID, they are supposed to be distributed over different physical storage devices, so that when a physical storage device where one extent among the multiple extents resides fails, a rebuild operation may be performed so as to recover data from a physical storage device where other extent resides.

It will be understood that due to the difference in service time and service condition between various storage devices in the resource pool, these storage devices might have different wear degrees. At this point, it is a tough technical issue regarding how to control the wear degree of each storage device in the resource pool and further avoid data loss in the storage system.

SUMMARY

Therefore, it is desirable to develop and implement a technical solution for managing a storage system more effectively. It is desired that the technical solution can be compatible with existing storage systems and manage the storage system more effectively by reconstructing various configurations of existing storage systems.

According to a first aspect of the present disclosure, there is provided a method for managing a storage system. In the method, a target storage device is selected from multiple storage devices associated with the storage system in response to respective wear degrees of the multiple storage devices being higher than a first predetermined threshold. Regarding multiple extents in the multiple storage devices, respective access loads of the multiple extents are determined. A source extent is selected from multiple extents residing on storage devices other than the target storage device, on the basis of the respective access loads of the multiple extents. Data in the source extent are moved to the target storage device.

According to a second aspect of the present disclosure, there is provided an apparatus for managing a storage system, including: at least one processor; a volatile memory; and a memory coupled to the at least one processor, the memory having instructions stored thereon, the instructions, when executed by the at least one processor, causing the apparatus to perform acts. The acts include: selecting a target storage device from multiple storage devices associated with the storage system in response to respective wear degrees of the multiple storage devices being higher than a first predetermined threshold; regarding multiple extents in the multiple storage devices, determining respective access loads of the multiple extents; selecting a source extent from multiple extents residing on storage devices other than the target storage device, on the basis of the respective access loads of the multiple extents; and moving data in the source extent to the target storage device.

According to a third aspect of the present disclosure, there is provided a computer program product. The computer program product is tangibly stored on a non-transient computer readable medium and includes machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION

Figure 1A:
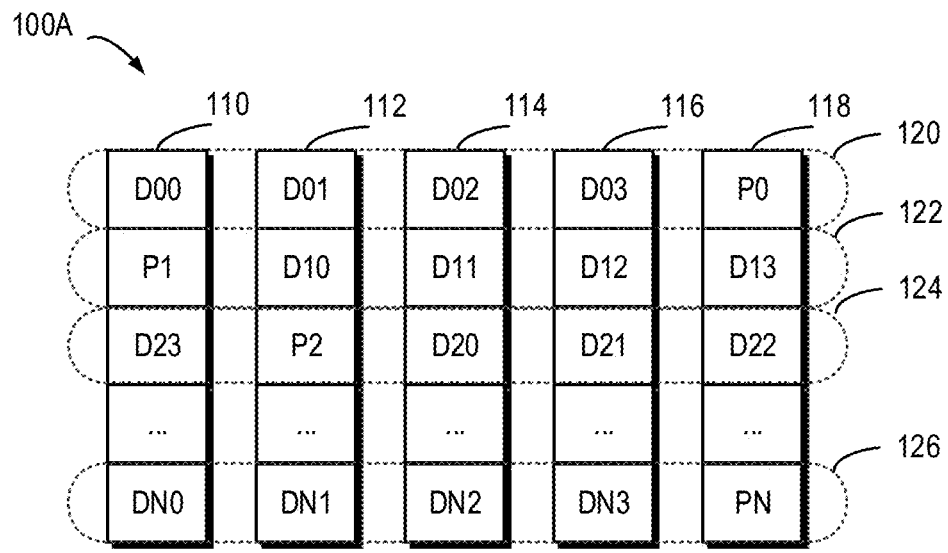
FIGS. 1A and 1B each illustrate a schematic view of a storage system in which a method of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

In the context of the present disclosure, the storage system may be a RAID-based storage system. The RAID-based storage system may combine multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

FIG. 1A schematically illustrates a schematic view of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that consists of five independent storage devices (110, 112, 114, 116 and 118) as an example. It should be noted although five storage devices are schematically shown in FIG. 1A, in other implementations more or less storage devices may be comprised according to different levels of RAID. Moreover, although FIG. 1A illustrates stripes 120, 122, 124, . . . , 126, in other examples the RAID system may further include a different number of stripes.

In RAID, a stripe crosses multiple physical storage devices (for example, the stripe 120 crosses storage the devices 110, 112, 114, 116 and 118). The stripe may be simply construed as a storage area among multiple storage devices which satisfies a given address range. Data stored in the stripe 120 includes multiple parts: a data block D00 stored in the storage device 110, a data block D01 stored in the storage device 112, a data block D02 stored in the storage device 114, a data block D03 stored in the storage device 116, and a data block P0 stored in the storage device 118. In this example, the data blocks D00, D01, D02 and D03 are stored data, and the data block P0 is a P parity of the stored data.

The mode of storing data in other stripes 122 and 124 is similar to that in the stripe 120, and the difference is that the parity about other data block may be stored in other storage device than the storage device 118. In this way, when one of the multiple storage devices 110, 112, 114, 116 and 118 fails, data in the failed device may be recovered from other normal storage devices.

Figure 1B:
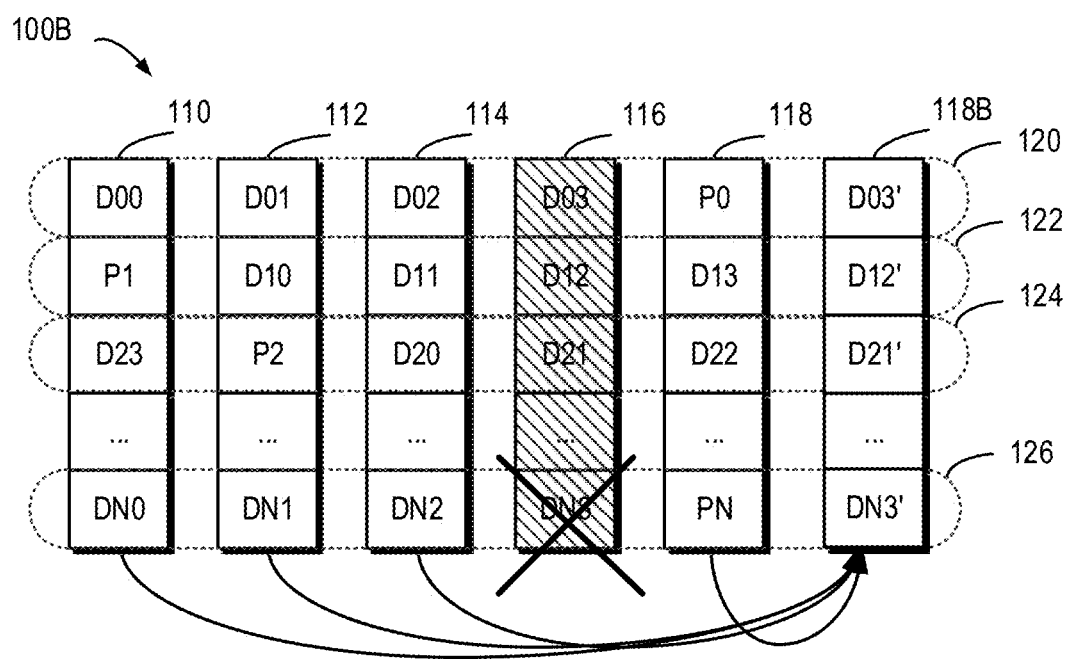

FIG. 1B schematically illustrates a schematic view 100B of rebuilding process of the storage system 100A. As shown in FIG. 1B, when one storage device (e.g. the shaded storage device 116) fails, data may be recovered from the other storage devices 110, 112, 114 and 118 that operate normally. At this point, a new backup storage device 118B may be added to RAID to replace the storage device 118. In this way, recovered data may be written to 118B, and system rebuilding may be realized.

Note while a RAID-5 storage system including 5 storage devices (among which 4 storage devices are used for storing data and 1 storage device is used for storing parity) has been described with reference to FIGS. 1A and 1B, according to definition of other RAID levels, there may further exist a storage system including a different number of storage devices. On the basis of definition of RAID-6, for example, two storage devices may be used to store parity P and Q respectively. For another example, according to definition of triple-parity RAID, three storage devices may be used to store parity P, Q and R respectively.

Figure 2:
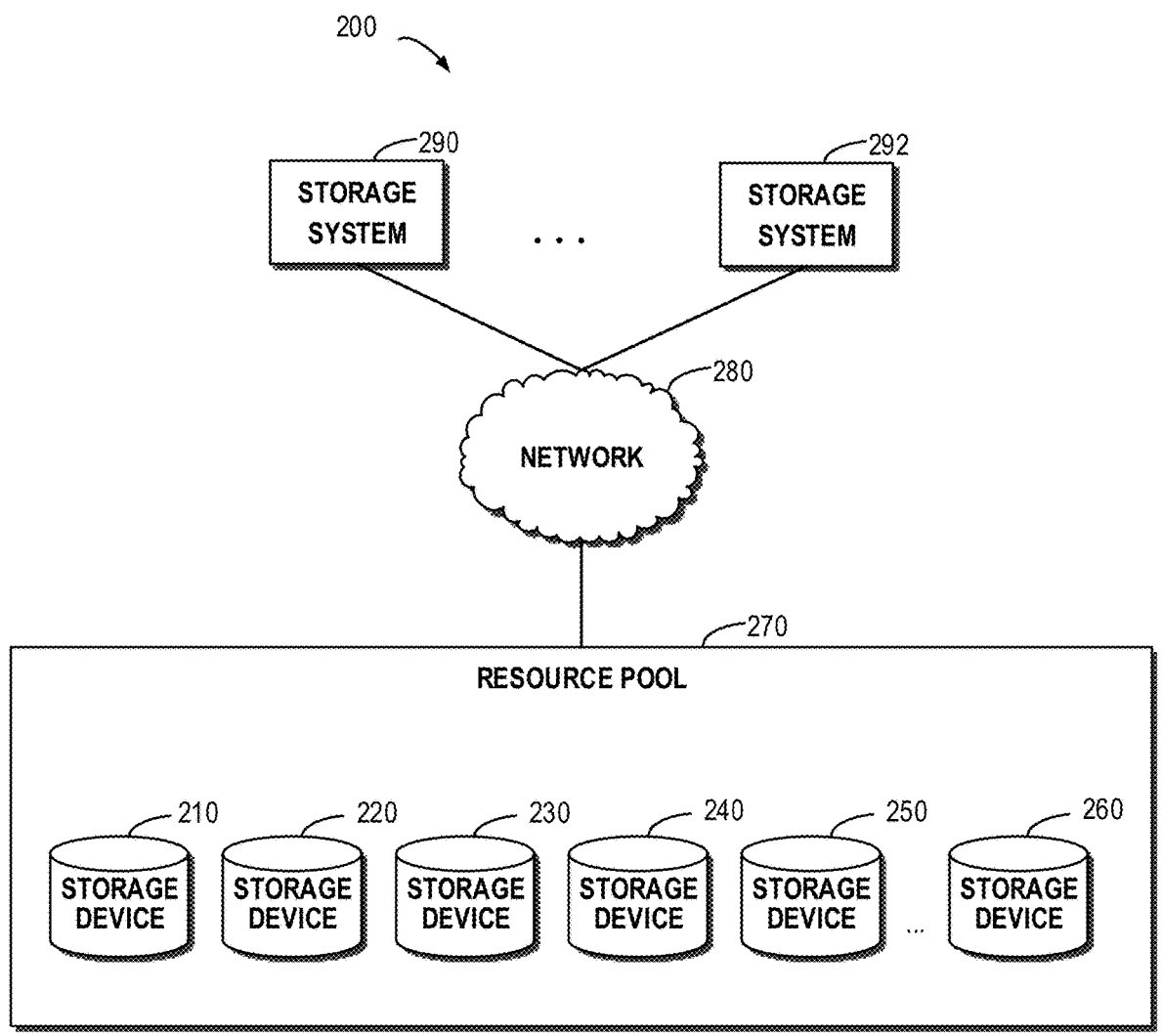
FIG. 2 schematically illustrates a block diagram of an example environment in which a method of the present disclosure may be implemented.

With the development of distributed storage technologies, the various storage devices 110, 112, 114, 116 and 118 in the storage system shown in FIGS. 1A and 1B may be no longer limited to physical storage devices but may be virtual storage devices. For example, respective extents on the storage device 110 may come from different physical storage devices (hereinafter referred to as storage devices for short) in the resource pool. FIG. 2 schematically shows a block diagram of an example environment in which the method of the present disclosure may be implemented. As depicted, a storage resource pool 270 may include multiple physical storage devices 210, 220, 230, 240, 250, . . . , 260. At this point, storage space in the multiple storage devices may be allocated to multiple storage systems 290, . . . , 292. At this point, these storage devices 290, . . . , 292 may access the storage space in the various storage devices in the storage resource pool 270 via a network 280.

Figure 3:
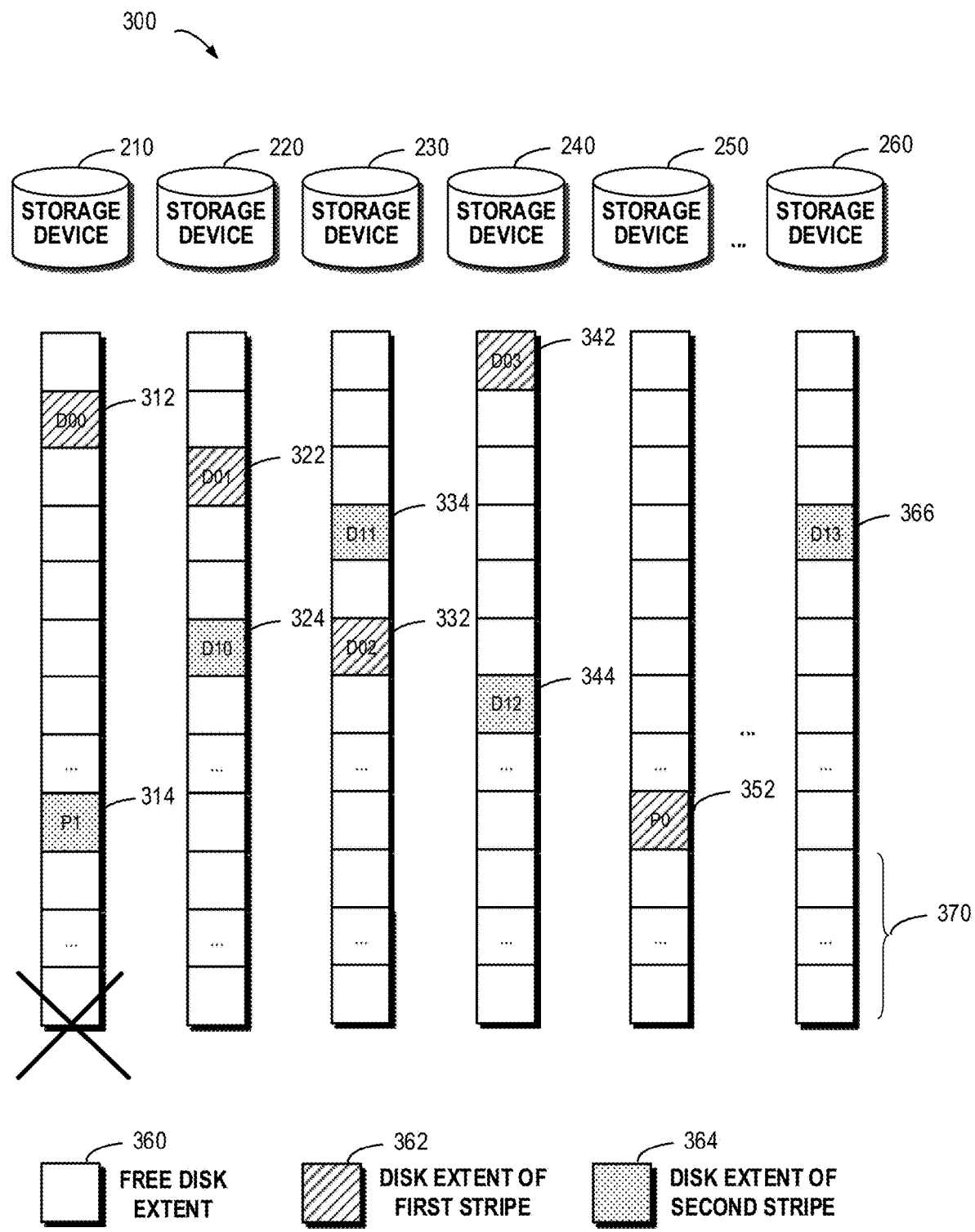
FIG. 3 schematically illustrates a diagram of a storage resource pool in FIG. 2.

FIG. 3 schematically shows a diagram of more information of the storage resource pool 270 as shown in FIG. 2. The resource pool 270 may include multiple storage devices 210, 220, 230, 240, 250, . . . , 260. Each storage device may include multiple extents, for example, a schematic view of extents comprised in each storage device is shown in the upper portion of the storage device. A blank extent (as shown by a legend 360) represents a free extent, an extent (as shown by a legend 362) shown with slashes represents an extent for a first stripe of the storage system 110A in FIG. 1, and a shaded extent (as shown by a legend 364) represents an extent for a second stripe of the storage system 110A in FIG. 1. At this point, extents 312, 322, 332, 342 and 352 for the first stripe are for storing data blocks D00, D01, D02, D03 and parity P0 of the first stripe respectively. Extents 324, 334, 344, 366 and 314 for the second stripe are for storing blocks D10, D11, D12, D13 and parity P1 of the second stripe respectively.

As shown in FIG. 3, there may exist a reserved free portion 370 in each storage device, so that when a storage device in the resource pool fails, extents in the free portion 370 in each storage device may be selected to rebuild various extents in the failed storage device.

Note in FIG. 3 the 4D+1P RAID-5 storage system is taken as an example to illustrate how extents in various stripes are distributed over multiple storage systems in the resource pool. When RAID based on other level is used, those skilled in the art may implement concrete details on the basis of the above described principles. For example, in the 6D+1P+1Q RAID-6 storage system, 8 extents in each stripe may be distributed over multiple storage devices so as to ensure a load balance between the multiple storage devices.

Figure 4A:
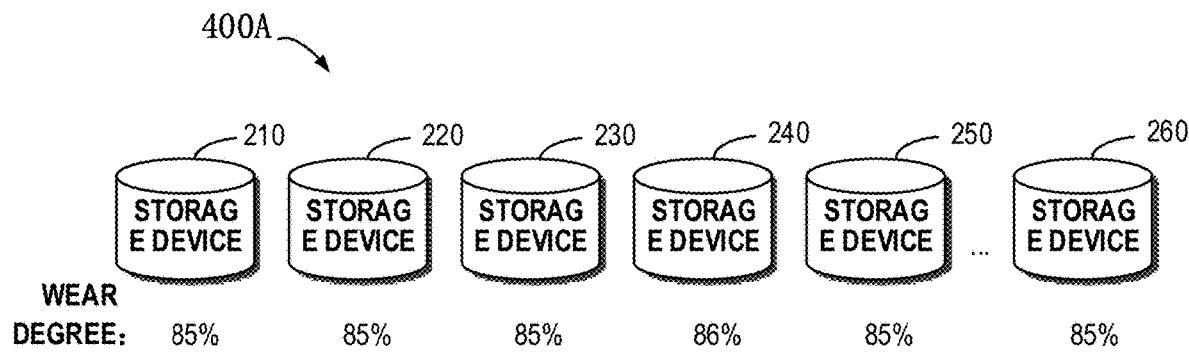
FIG. 4A schematically illustrates a block diagram for managing a storage system according to one technical solution.

Technical solutions have been proposed to control respective wear levels of storage devices in the storage resource pool 270 and further manage the storage resource pool 270 and update devices. The storage devices 210 to 260 are not indefinitely usable but have specific service lives. FIG. 4A schematically shows a block diagram 400A for managing a storage system according to one technical solution. As depicted, with the traditional technical solution, wear degrees of the storage devices 210 to 260 associated with the storage system may be maintained at similar levels. In the example of FIG. 4A, wear degrees of the storage devices 210, 220, 230, 250 and 260 are 85%, while the wear degree of the storage device 240 is 86%.

It will be understood if the technical solution as shown in FIG. 4A is used all along, then the storage devices 210 to 260 will almost simultaneously enter the end of life. This will bring about an upsurge in workloads to administrators and might cause data loss because multiple storage devices fail at the same time. When the wear level of a storage device reaches a certain degree (e.g., above 96%), the storage device might be confronted with the end of life.

Although the technical solution of FIG. 4A may guarantee various storage devices in the storage resource pool 270 are maintained at similar wear levels during use, similar wear levels will cause the storage devices in the storage resource pool 270 to almost simultaneously enter the end of life. At this point, multiple storage devices need to be renewed almost at the same time. On the one hand, this will cause a huge workload to administrators of the storage system; on the other hand, multiple storage devices are confronted with the end of life and hence might fail at any time, which further causes data loss in the storage system.

In order to solve the foregoing drawbacks, implementations of the present disclosure provide a method, apparatus and computer program product for managing a storage system. Detailed description is presented below to specific implementations of the present disclosure. According to implementations of the present disclosure, provided is a method for managing a storage system. In the method, in response to respective wear degrees of multiple storage devices associated with the storage system being higher than a first predetermined threshold, a target storage device is selected from the multiple storage devices. Regarding multiple extents in at least one storage device other than the target storage device among the multiple storage devices, respective access loads of the multiple extents are determined. A source extent is selected from the multiple extents on the basis of the respective access loads of the multiple extents. Data in the source extent are moved to the target storage device.

With the foregoing example implementations, when the wear degree of each storage device in the resource pool 270 is higher than the first determined threshold, the method according to implementations of the present disclosure is started. By selecting the target storage device from the multiple storage devices (e.g., a storage device having the highest wear degree may be selected as the target storage device) and moving to the target storage device an extent having a heavier access load in the respective storage device, the wear degree of the target storage device may be caused to reach a requirement for device renewal, and then the target storage device may be replaced. In this way, multiple storage devices may be caused to enter the end of life at different time points, and further it may be avoided that the storage devices in the resource pool 270 need to be replaced at the same time. On the one hand, storage devices in the resource pool 270 which have reached the end of life may be renewed at different time points; on the other hand, the potential data loss in the storage system caused by the simultaneous end of life of multiple storage devices may be avoided. More details about the method for managing a storage system will be described with reference to FIG. 4B below.

It will be understood although implementations for managing a storage system are described by taking the resource pool 270 of a RAID-based storage system as an example throughout the context of the present disclosure, example implementations according to the present disclosure may further be implemented in other resource pool consisting of multiple storage devices.

Figure 4B:
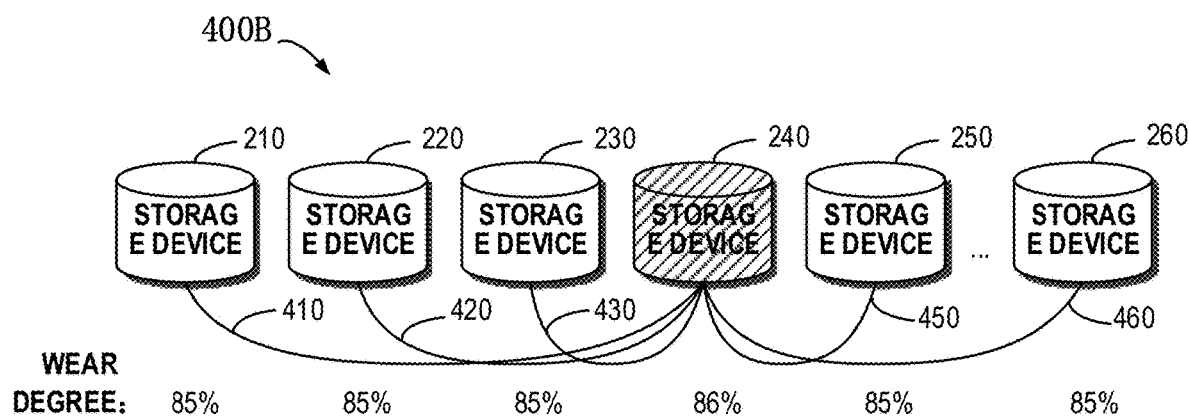
FIG. 4B schematically illustrates a block diagram for managing a storage system according to implementations of the present disclosure.

FIG. 4B schematically shows a block diagram 400B for managing a storage system according to implementations of the present disclosure. In the implementations, respective wear degrees of the storage devices 210 to 260 may be monitored, and when wear degrees meet a predetermined condition (e.g., the wear degree of each storage device is higher than 85% or other value), one storage device 240 (e.g., having the highest wear degree) may be selected from the storage devices 210 to 260 as a target storage device. Next, an extent having a heavier access load on a storage device other than the target storage device 240 is moved to the target storage device 240, so that the target storage device 240 may be accessed more frequently. In this way, the speed that the target storage device 240 reaches the end of life may be accelerated, and further it may be avoided the storage devices 210 to 260 reach the end of life at similar time points.

Figure 5:
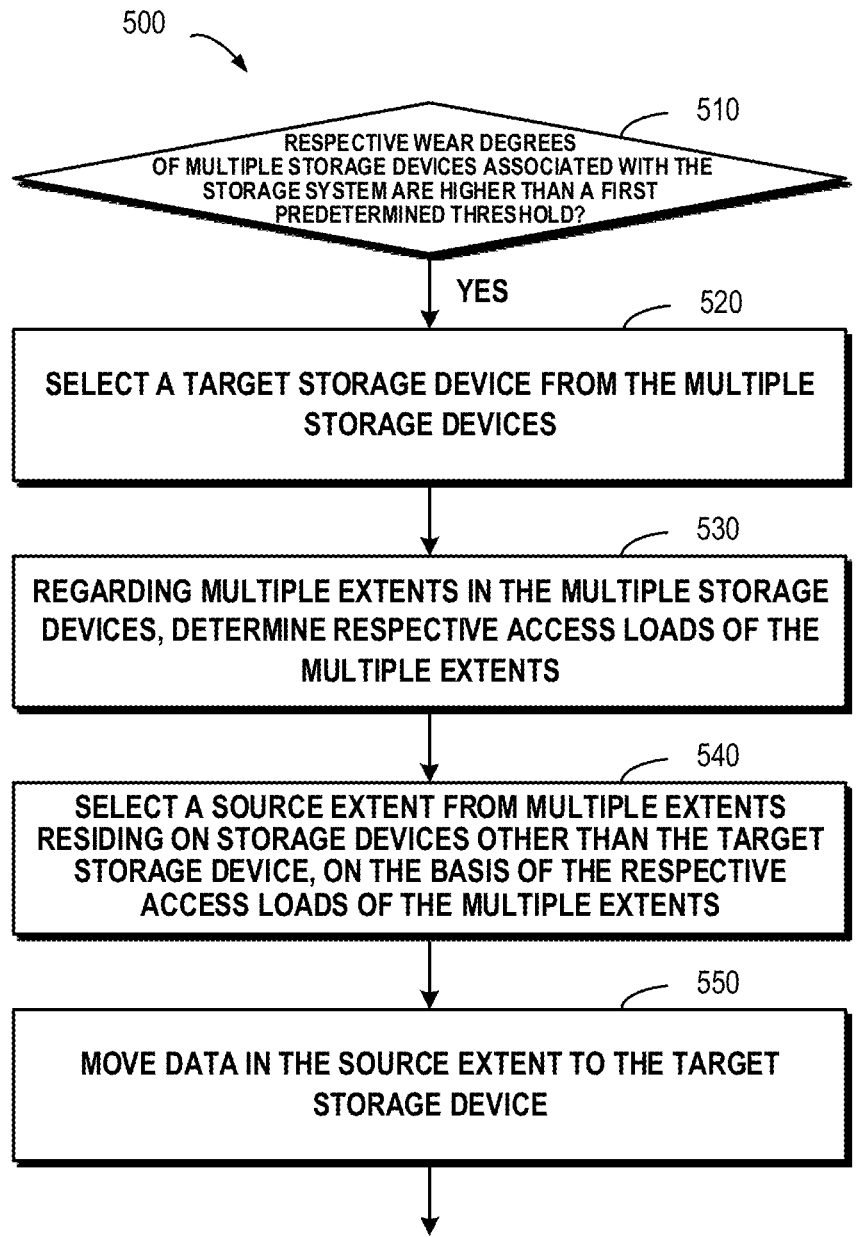
FIG. 5 schematically illustrates a flowchart of a method for managing a storage system according to implementations of the present disclosure.

With reference to FIG. 5, detailed description is presented below to more details on how to manage a storage system. FIG. 5 schematically shows a flowchart 500 of a method for managing a storage system according to implementations of the present disclosure. At block 510, first it is judged whether respective wear degrees of multiple storage devices associated with the storage system are higher than a first predetermined threshold or not. The first predetermined threshold may be defined as a wear degree with which a storage device is about to reach the end of life. For example, when the wear degree is denoted as a percentage, the first predetermined threshold may be set to a value around 85%.

According to example implementations of the present disclosure, wear degrees of different storage devices may be compared with the first predetermined threshold. For example, the wear degree of each of the multiple storage devices may be compared with the first predetermined threshold so as to determine the judgment result at block 510. For another example, the highest or lowest wear degree may be selected to be compared with the first predetermined threshold. Still for another example, since wear degrees of the multiple storage devices are similar, any storage device may be selected from the multiple storage devices, and the wear degree of the selected storage device may be compared with the first predetermined threshold.

Detailed description is presented below to how to determine the wear degree of a storage device. Regarding a given storage device among the multiple storage devices, the wear degree may be determined on the basis of an erase count associated with the given storage device. It will be understood the maximum erase count MAX permitted by the given storage device may be determined on the basis of the model of the given storage device. Here the maximum erase count is an erase count given by the manufacturer of the storage device which ensures the storage device to work normally. When the erase count of the storage device is lower than the maximum value, the storage device may work normally, while the erase count of the storage device is higher than the maximum value, then the storage device will be confronted with the end of life and might fail.

Therefore, the wear degree for the given storage device may be determined on the basis of a ratio of an erase count N of performed erase operations to the maximum erase count MAX of the given storage device. According to example implementations of the present disclosure, suppose the maximum erase count MAX=1000, while erase operations have been performed to the given storage device for 700 times, then at this point the wear degree of the given storage device equals 700/1000*100%=70%.

Still with reference to FIG. 5, at block 520, a target storage device may be selected from the multiple storage devices. According to example implementations of the present disclosure, since wear degrees of the storage devices 210 to 260 are similar, a storage device may be randomly selected from the storage devices 210 to 260 as the target storage device. According to example implementations of the present disclosure, a storage device having a higher (e.g., highest) wear degree may be selected from the multiple storage devices as the target storage device. In this way, the wear degree of the target storage device may be caused to reach the condition for replacing the target storage device with a backup storage device.

At block 530, regarding multiple extents in the multiple storage devices, respective access loads of the multiple extents are determined. Continuing the example in FIG. 4B, each of the storage devices 210 to 260 may include multiple extents, and the access load of each extent may be determined. Here the access load is a load of access that increases the wear degree of a storage device where the extent resides. It will be understood regarding storage devices of solid state disk (SSD) type, the service life of a storage device depends on the ratio of a performed erase count to the maximum erase count of the storage device. Since a write operation leads to an erase operation while a read operation does not lead to an erase operation, the access load of each extent may be determined on the basis of write operations to each extent.

According to example implementations of the present disclosure, regarding a given extent among the multiple extents, the access load may be determined on the basis of a frequency that writes are performed to the given extent. For example, the access load may be determined by a frequency that writes have been performed to the given extent for a past period of time. In this way, the access load of each extent may be measured quantitatively. It will be understood since the impact of write operations on the wear degree of the storage device further depends on the amount of written data, the access load may further be determined on the basis of the amount of data written to the given extent. In this way, the access load of each extent may be accurately determined at finer granularity. According to example implementations of the present disclosure, the access load may further be determined on the basis of both the frequency of writes and the amount of written data.

At block 540, a source extent is selected from multiple extents in a storage device other than the target storage device on the basis of the respective access loads of the multiple extents. It will be understood here the source extent refers to an extent to be moved to the target storage device. According to example implementations of the present disclosure, an extent having a higher access load may be selected from the multiple extents as the source extent. Since the source extent has a higher access load, generally after data in the source extent are moved to a destination extent in the target storage device, the access load of the destination extent will be maintained at a higher level. With the above example implementations, the wear degree of the target storage device may be caused to fast reach the condition for replacing the target storage device with a backup storage device.

Figure 6A:
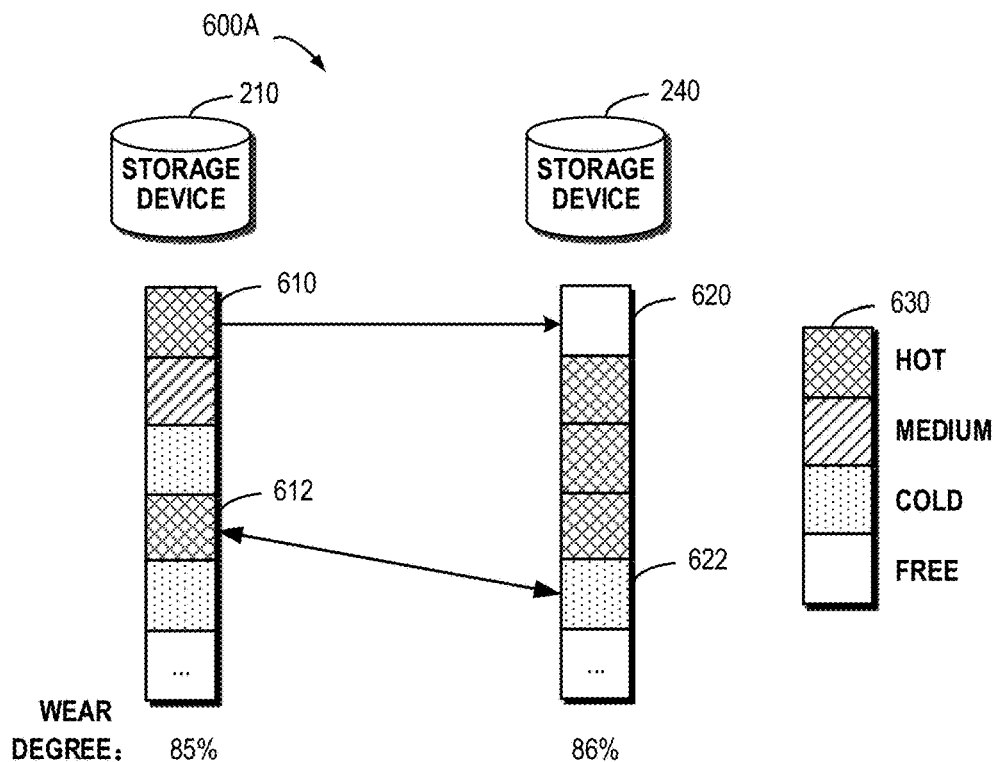
FIG. 6A schematically illustrates a block diagram of extents in various storage devices before a data move according to implementations of the present disclosure.
Figure 6B:
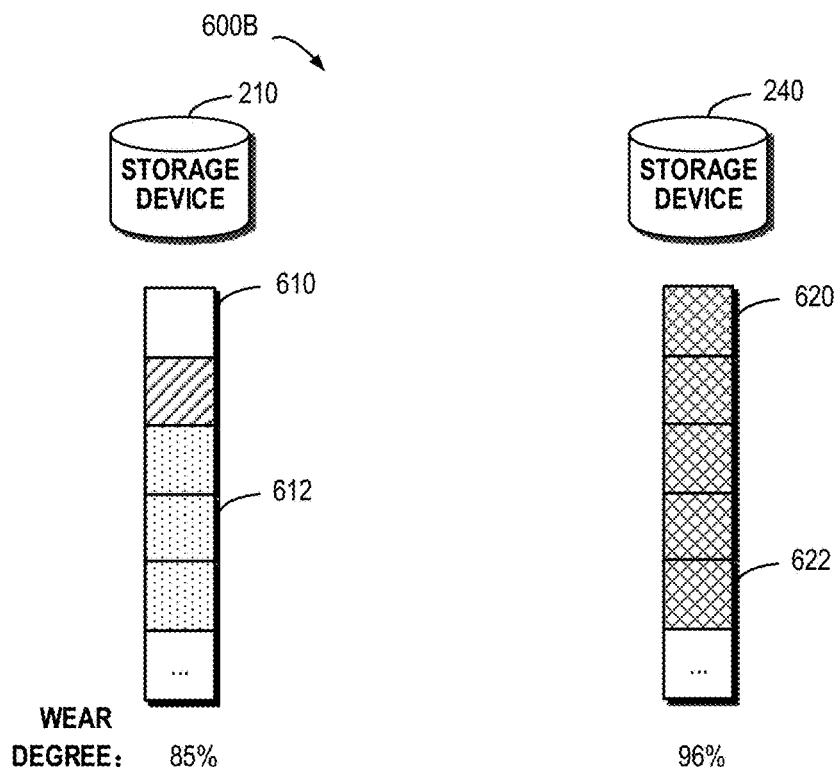
FIG. 6B schematically illustrates a block diagram of extents in various storage devices after the data move according to implementations of the present disclosure.

At block 550, data in the source extent are moved to the target storage device. In view of the state of each extent in the target storage device, different approaches may be used to move data in the source extent. According to example implementations of the present disclosure, if there is a free extent in the target storage device, then data in the source extent may be directly moved to the free extent. With reference to FIGS. 6A and 6B, detailed description is presented below to how to move data in the source extent.

FIG. 6A schematically shows a block diagram 600A of extents in various storage devices before a data move according to implementations of the present disclosure. With reference to FIG. 6A, the storage device 240 is selected as a target storage device, at which data will be moved from the storage device 210 to the target storage device 240. With reference to a legend 630, different patterns represent different access loads: grid patterns represent extents having higher access loads (i.e., "hot" extents); slash patterns represent extents having medium access loads (i.e., medium extents); shaded patterns represent extents having lower access loads (i.e., "cold" extents); and blank patterns represent free extents which have not been used.

In FIG. 6A, multiple extents below the target storage device 240 represent extents in the target storage devices 240, among which an extent 620 represents a free extent and an extent 622 represents a cold extent. Multiple extents below the storage device 210 represent extents in the storage device 210, among which extents 610 and 612 represent hot extents. According to the above principle, the hot extents 610 and 612 may be moved to the target storage device 240. Since there is a free extent 620 in the target storage device 240, data in the extent 610 may be directly moved to the free extent 620.

FIG. 6B schematically shows a block diagram 600B of extents in various storage devices after the data move according to implementations of the present disclosure. As depicted, after the data move, hot data that used to be in the extent 610 in the storage device 210 are moved to the extent 620 in the target storage device 240. At this point, the extent 610 in the storage device 210 becomes a free extent. With the above example implementations, the increase speed of the wear degree of the storage device 210 may fall. As various extents in the target storage device 240 are accessed, the increase speed of the wear degree of the target storage device 240 will rise. For example, after a period of time, the wear degree might reach a second predetermined threshold (e.g., 96% or other value) for the triggering the condition for replacing the target storage device 240 with a backup storage device.

According to example implementations of the present disclosure, if there is no free extent in the target storage device, then a destination extent may be selected from the target storage device, and data in the target extent and the destination extent are swapped. Specifically, access loads of multiple extents in the target storage device may be determined first. Still with reference to FIG. 6A, after data in the extent 610 are moved to the extent 620, there is no free extent in the target storage device. At this point, an extent 622 having a lower access load is selected from the multiple extents as the destination extent. Subsequently, hot data in the extent 612 in the storage device 210 may be swapped with cold data in the extent 622 in the target storage device 240.

As shown in FIG. 6B, after the data exchange, hot data that used to be in the extent 612 in the storage device 210 are swapped to the extent 622 in the target storage device 240, and cold data that used to be in the extent 622 in the target storage device 240 are swapped to the extent 612 in the storage device 210. At this point, the increase speed of the wear degree of the storage device 210 will slow down, while the increase speed of the wear degree of the target storage device 240 will accelerate. With the above example implementations, the target storage device 240 will first reach the second predetermined threshold before the storage devices 210 to 230, 250 and 260.

According to example implementations of the present disclosure, the wear degree of the target storage device 240 may be obtained periodically. If the wear degree is higher than the second threshold, then data in each extent in the target storage device are migrated to the backup storage device. Here the data migration refers to using the backup storage device to replace the target storage device 240 that has entered the end of life. The data migration may be implemented on the basis of an existing solution. Specifically, data in each extent in the target storage device may be copied to a corresponding extent in the backup storage device in parallel or in series. Further, an address mapping of the storage system may be updated on the basis of addresses of corresponding extents.

According to example implementations of the present disclosure, the method 500 may be performed to each of the multiple storage devices one by one. Specifically, after the target storage device 240 is replaced with the backup storage device, a further storage device may be selected from at least one storage device as the target storage device. Referring back to FIG. 4, since wear degrees of the storage devices 210 to 230, 250 and 260 other than the storage device 240 are all 85%, a random storage device may be selected from these storage devices as the target storage device, and the method 500 described with reference to FIG. 5 may be repeated.

Figure 7:
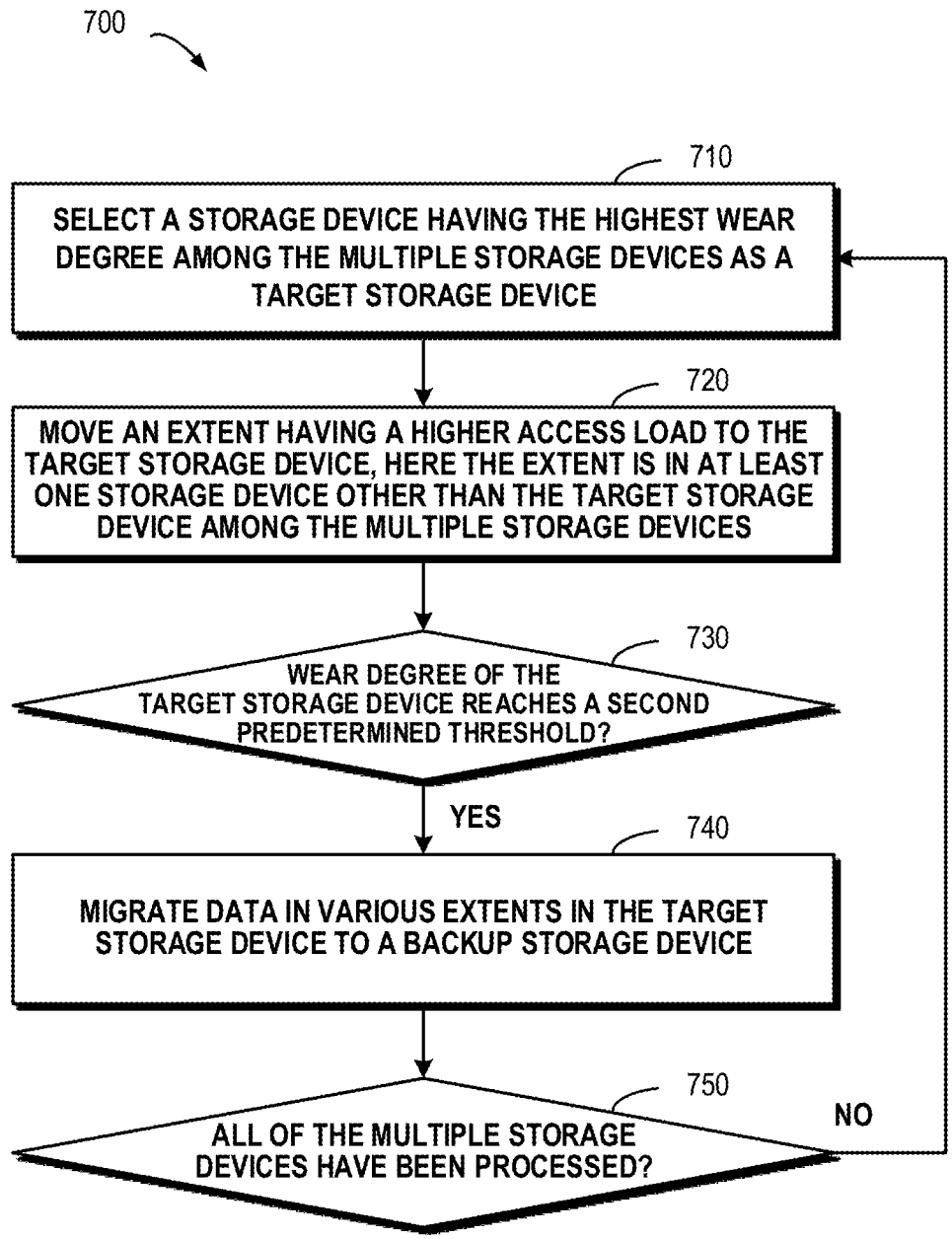
FIG. 7 schematically illustrates a flowchart of a method for managing a storage system according to implementations of the present disclosure.

FIG. 7 schematically shows a flowchart of a method 700 for managing a storage system according to implementations of the present disclosure. The method 700 starts at block 710, where a storage device having the highest wear degree among the storage devices 210 to 260 may be selected as the target storage device. Since the wear degree (86%) of the storage device 240 is higher than wear degrees (85%) of other storage devices, the storage device 240 may be selected as the target storage device. At block 720, an extent having a higher access load in at least one of the storage devices 210 to 230, 250 and 260 other than the target storage device may be moved to the target storage device 240.

It will be understood the methods 500 and 700 described in the present disclosure do not affect normal operations of the storage system, but the storage system may operate normally and continue to serve access requests from various users. With the running of the storage system, the wear degree of the target storage device 240 may increase continuously. As shown at block 730, the wear degree of the target storage device 240 may be monitored, and it may be judged whether the monitored wear degree reaches the second predetermined threshold or not. If the judgment result is "yes," then the method 700 proceeds to block 740. At this point, data in each extent in the target storage device may be migrated to the backup storage device by using the above method. At block 750, it may be judged whether all the storage devices 210 to 260 have been processed or not. If the judgment result is "no," then the method 700 returns to block "710" so as to process a next storage device; if the judgment result is "yes," then the method 700 ends.

Figure 8:
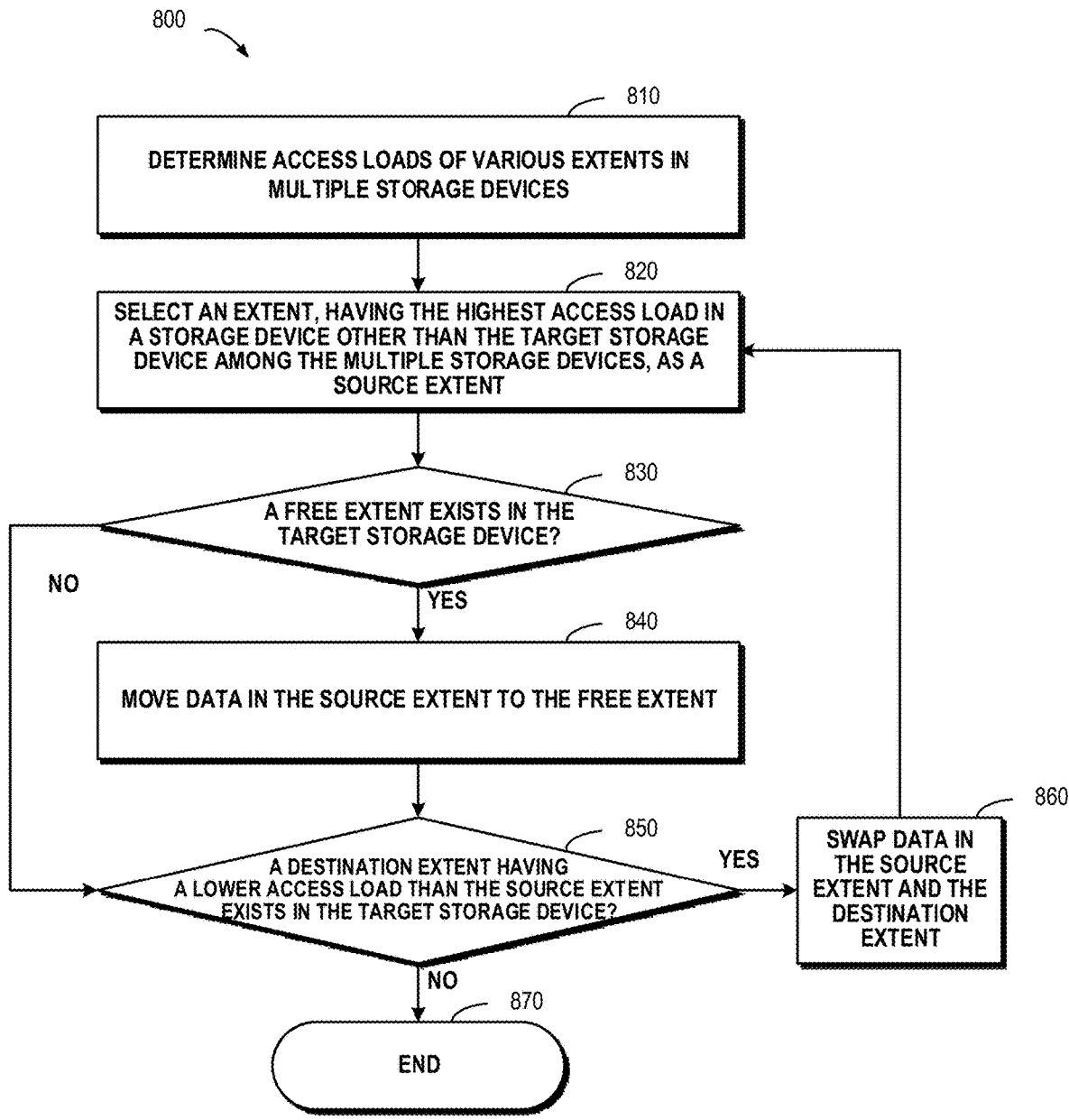
FIG. 8 schematically illustrates a flowchart of a method for moving data between two storage devices according to implementations of the present disclosure.

With reference to FIG. 8, description is presented below to more details about the data move shown at block 720 in FIG. 7. FIG. 8 schematically shows a flowchart of a method 800 for moving data between two storage devices according to implementations of the present disclosure. At block 810, access loads of various extents in the storage devices 210 to 260 may be determined. Subsequently, at block 820, an extent having the highest access load in the storage devices 210 to 230, 250 and 260 other than the target storage device 240 is selected at a source extent. Here the source extent refers to an extent to be moved to the target storage device 240.

In subsequent operations, processing will be performed depending on whether there is a free extent in the target storage device 240. As shown at block 830, first it is judged whether there is a free extent in the target storage device 240 or not. If the judgment result at block 830 is "yes," then the method 800 proceeds to block 840. At this point, data in the source extent may be directly moved to the free extent. If the judgment result at block 830 is "no," then the method 800 proceeds to block 850. It may be judged whether there is a destination extent in the target storage device 240 or not, and the access load of such a destination extent is lower than that of the source extent. If the judgment result at block 850 is "yes," then the method 800 proceeds to block 860. At block 860, data in the source extent and the destination extent may be swapped. If the judgment result at block 850 is "no," this means the access load of each extent in the target storage device has reached the top. At this point, the method 800 proceeds to block 870 and ends.

According to example implementations of the present disclosure, the storage system described herein may be a mapped RAID storage system described with reference to FIG. 3. Therefore, after data are moved between two storage devices, an address mapping between the storage system and the multiple storage devices needs to be updated on the basis of an original address of the source extent and a new address of moved data in the target storage device. Specifically, the original address in the address mapping may be replaced with the new address. Subsequently, an access request for data in the storage system may be processed on the basis of the updated address mapping. With the above example implementations, it may be guaranteed the user request may accurately access the desired data.

While examples of the method according to the present disclosure have been described in detail with reference to FIGS. 2 to 8, description is presented below to the implementation of a corresponding apparatus. According to example implementations of the present disclosure, provided is an apparatus for managing a storage system. The apparatus includes: a selecting module configured to select a target storage device from multiple storage devices associated with the storage system in response to respective wear degrees of the multiple storage devices being higher than a first predetermined threshold; a determining module configured to, regarding multiple extents in the multiple storage devices, determine respective access loads of the multiple extents; a source selecting module configured to select a source extent from multiple extents residing on storage devices other than the target storage device, on the basis of the respective access loads of the multiple extents; and a moving module configured to move data in the source extent to the target storage device.

According to example implementations of the present disclosure, the selecting module is further configured to: regarding a given storage device among the multiple storage devices, determining an erase count of erase operations which have been performed to the given storage device; and determining a wear degree for the given storage device on the basis of the erase count and the maximum erase count permitted by the given storage device.

According to example implementations of the present disclosure, the selecting module is further configured to select a storage device having a higher wear degree among the multiple storage devices as the target storage device.

According to example implementations of the present disclosure, the determining module is further configured to: regarding a given extent among the multiple extents, determine an access load of the given extent on the basis of any of: a frequency that writes are performed to the given extent or the amount of data written to the given extent.

According to example implementations of the present disclosure, the source selecting module is further configured to select an extent having a higher access load among the multiple extents as the source extent.

According to example implementations of the present disclosure, the moving module is further configured to, in response to a free extent existing in the target storage device, move data in the source extent to the free extent.

According to example implementations of the present disclosure, the moving module is further configured to, in response to no free extent existing in the target storage device, determine access loads of multiple extents in the target storage device; select an extent having a lower access load among the multiple extents as a destination extent; and swap data in the source extent and the destination extent.

According to example implementations of the present disclosure, the apparatus further includes an updating module configured to: obtain a wear degree of the target storage device; and migrate data in various extents in the target storage device to a backup storage device in response to the wear degree being higher than a second threshold.

According to example implementations of the present disclosure, the updating module is further configured to: update an address mapping between the storage system and the multiple storage devices on the basis of an address of the source extent and an address of the data moved from the source extent in the target storage device; and process an access request for data in the storage system on the basis of the updated address mapping.

According to example implementations of the present disclosure, the selecting module is further configured to select a further storage device from at least one storage devices as the target storage device.

Figure 9:
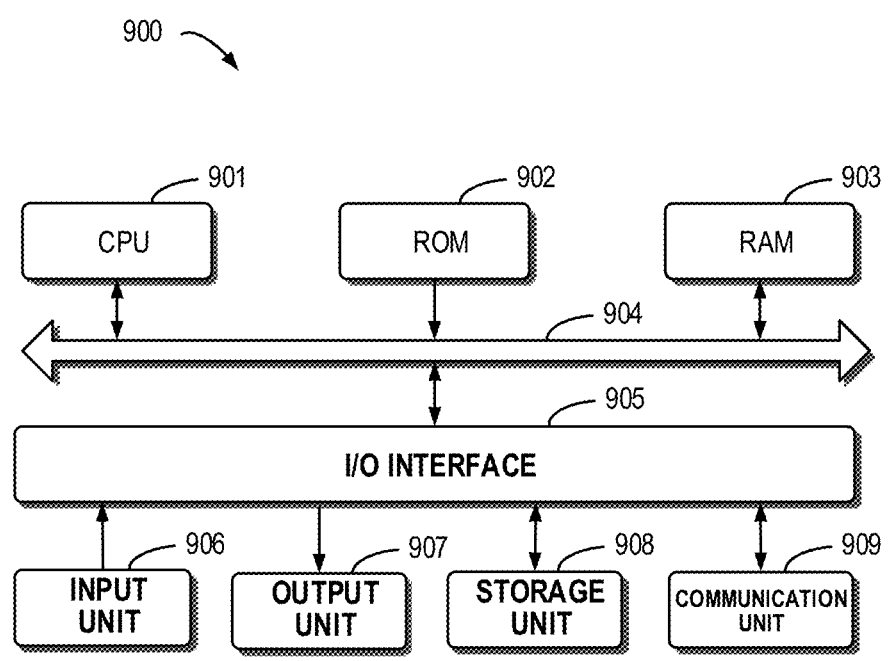
FIG. 9 schematically illustrates a block diagram of an apparatus for managing a storage system according to example implementations of the present disclosure.

FIG. 9 schematically shows a block diagram of an apparatus 900 for managing a storage system according to example implementations of the present disclosure. As depicted, the apparatus 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the apparatus 900. CPU 901, ROM 902 and RAM 903 are connected to each other via a bus 904. The input/output (I/O) interface 905 is also connected to the bus 904.

A plurality of components in the apparatus 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the apparatus 900 to exchange information/data with other devices via the computer network, such as Internet, and/or various telecommunication networks.

The above described each process and treatment, such as the methods 500, 700 and 800, can also be executed by the processing unit 901. For example, in some implementations, the methods 500, 700 and 800 can be implemented as a computer software program tangibly included in the machine-readable medium, e.g., the storage unit 908. In some implementations, the computer program can be partially or fully loaded and/or mounted to the apparatus 900 via ROM 902 and/or the communication unit 909. When the computer program is loaded to the RAM 903 and executed by the CPU 901, one or more steps of the above described methods 500, 700 and 800 can be implemented. Alternatively, in other implementations, the CPU 901 also can be configured in other suitable manners to realize the above procedure/method.

According to example implementations of the present disclosure, there is provided an apparatus for managing a storage system, the apparatus including: at least one processor; a volatile memory; and a memory coupled to the at least one processor, the memory having instructions stored thereon, the instructions, when executed by the at least one processor, causing the apparatus to perform acts. The acts include: selecting a target storage device from multiple storage devices associated with the storage system in response to respective wear degrees of the multiple storage devices being higher than a first predetermined threshold; regarding multiple extents in the multiple storage devices, determining respective access loads of the multiple extents; selecting a source extent from multiple extents residing on storage devices other than the target storage device, on the basis of the respective access loads of the multiple extents; and moving data in the source extent to the target storage device.

According to example implementations of the present disclosure, obtaining respective wear degrees of the multiple storage devices includes: regarding a given storage device among the multiple storage devices, determining an erase count of erase operations which have been performed to the given storage device; and determining a wear degree for the given storage device on the basis of the erase count and the maximum erase count permitted by the given storage device.

According to example implementations of the present disclosure, selecting a target storage device from the multiple storage devices includes: selecting a storage device having a higher wear degree among the multiple storage devices as the target storage device.

According to example implementations of the present disclosure, determining respective access loads of the multiple extents includes: regarding a given extent among the multiple extents, determining an access load of the given extent on the basis of any of: a frequency that writes are performed to the given extent or the amount of data written to the given extent.

According to example implementations of the present disclosure, selecting a source extent from the multiple extents includes: selecting an extent having a higher access load among the multiple extents as the source extent.

According to example implementations of the present disclosure, moving data in the source extent to the target storage device includes: in response to a free extent existing in the target storage device, moving data in the source extent to the free extent.

According to example implementations of the present disclosure, moving data in the source extent to the target storage device includes: in response to no free extent existing in the target storage device, determining access loads of multiple extents in the target storage device; selecting an extent having a lower access load among the multiple extents as a destination extent; and swapping data in the source extent and the destination extent.

According to example implementations of the present disclosure, the acts further include: obtaining a wear degree of the target storage device; migrating data in various extents in the target storage device to a backup storage device in response to the wear degree being higher than a second threshold.

According to example implementations of the present disclosure, the acts further include: updating an address mapping between the storage system and the multiple storage devices on the basis of an address of the source extent and an address of the data moved from the source extent in the target storage device; and processing an access request for data in the storage system on the basis of the updated address mapping.

According to example implementations of the present disclosure, the acts further include: selecting a further storage device from at least one storage devices as the target storage device.

According to example implementations of the present disclosure, there is provided a computer program product. The computer program product is tangibly stored on a non-transient computer readable medium and includes machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:
1. A method for managing a storage system, comprising:
selecting a target storage device from multiple storage devices associated with the storage system in response to a respective wear degree of each one of the multiple storage devices being higher than a first predetermined threshold, wherein selecting the target storage device from the multiple storage devices comprises selecting a storage device having a highest wear degree among the multiple storage devices as the target storage device;
regarding multiple extents in storage devices in the multiple storage devices other than the target storage device, determining a respective access load of each individual one of the multiple extents at least in part based on a frequency at which writes were performed to each one of the extents over a past period of time;
selecting a source extent from multiple extents residing on the storage devices in the multiple storage devices other than the target storage device, on the basis of the respective access loads of the individual ones of the multiple extents; and
moving data in the source extent to the target storage device,
wherein moving data in the source extent to the target storage device comprises: in response to no free extent existing in the target storage device,
determining access loads of multiple extents in the target storage device,
selecting, from among the multiple extents in the target storage device, a destination extent having i) a lowest access load among the multiple extents in the target storage device, and ii) an access load that is lower than an access load of the source extent, and swapping data in the source extent and the destination extent.

2. The method of claim 1, further comprising: obtaining respective wear degrees of the multiple storage devices, comprising: regarding a given storage device among the multiple storage devices,
determining an erase count of erase operations which have been performed to the given storage device; and
determining a wear degree for the given storage device on the basis of the erase count and the maximum erase count permitted by the given storage device.

3. The method of claim 1, wherein determining the respective access of each individual one of the multiple extents in the storage devices in the multiple storage devices other than the target storage device further comprises:

regarding each individual one of the multiple extents, determining the access load of the extent additionally on the basis of an amount of data written to the extent.

4. The method of claim 3, wherein selecting a source extent from the multiple extents residing on the storage devices in the multiple storage devices other than the target storage device comprises: selecting an extent having a highest access load among the multiple extents residing on the storage devices in the multiple storage devices other than the target storage device as the source extent.

5. The method of claim 1, wherein moving data in the source extent to the target storage device comprises: in response to a free extent existing in the target storage device, moving data in the source extent to the free extent.

6. The method of claim 1, further comprising:
obtaining a wear degree of the target storage device;
migrating data in various extents in the target storage device to a backup storage device in response to the wear degree being higher than a second threshold.

7. The method of claim 1, further comprising:
updating an address mapping between the storage system and the multiple storage devices on the basis of an address of the source extent and an address of the data moved from the source extent in the target storage device; and
processing an access request for data in the storage system on the basis of the updated address mapping.

8. The method of claim 7, further comprising:
selecting a further storage device from at least one storage devices as the target storage device.

9. An apparatus for managing a storage system, comprising:
at least one processor;
a volatile memory; and
a memory coupled to the at least one processor and having instructions stored thereon, the instructions, when executed by the at least one processor, causing the apparatus to perform acts comprising:
selecting a target storage device from multiple storage devices associated with the storage system in response to a respective wear degree of each one of the multiple storage devices being higher than a first predetermined threshold, wherein selecting the target storage device from the multiple storage devices comprises selecting a storage device having a highest wear degree among the multiple storage devices as the target storage device;
regarding multiple extents in storage devices in the multiple storage devices other than the target storage device, determining a respective access load of each individual one of the multiple extents at least in part based on a frequency at which writes were performed to each one of the extents over a past period of time;
selecting a source extent from multiple extents residing on storage devices in the multiple storage devices other than the target storage device, on the basis of the respective access loads of each individual one of the multiple extents; and
moving data in the source extent to the target storage device,
wherein moving data in the source extent to the target storage device comprises: in response to no free extent existing in the target storage device,
determining access loads of multiple extents in the target storage device,
selecting, from among the multiple extents in the target storage device, a destination extent having i) a lowest access load among the multiple extents in the target storage device, and ii) an access load that is lower than an access load of the source extent, and swapping data in the source extent and the destination extent.

10. The apparatus of claim 9, the acts further comprising: obtaining respective wear degrees of the multiple storage devices, comprising: regarding a given storage device among the multiple storage devices,
determining an erase count of erase operations which have been performed to the given storage device; and
determining a wear degree for the given storage device on the basis of the erase count and the maximum erase count permitted by the given storage device.

11. The apparatus of claim 9, wherein determining the respective access of each individual one of the multiple extents in the storage devices in the multiple storage devices other than the target storage device further comprises:
regarding each individual one of the multiple extents, determining the access load of the extent additionally on the basis of an amount of data written to the extent.

12. The apparatus of claim 11, wherein selecting a source extent from the multiple extents residing on the storage devices in the multiple storage devices other than the target storage device comprises: selecting an extent having a highest access load among the multiple extents residing on the storage devices in the multiple storage devices other than the target storage device as the source extent.

13. The apparatus of claim 9, wherein moving data in the source extent to the target storage device comprises: in response to a free extent existing in the target storage device, moving data in the source extent to the free extent.

14. The apparatus of claim 9, wherein the acts further comprise:
obtaining a wear degree of the target storage device; and
migrating data in various extents in the target storage device to a backup storage device in response to the wear degree being higher than a second threshold.

15. The apparatus of claim 9, wherein the acts further comprise:
updating an address mapping between the storage system and the multiple storage devices on the basis of an address of the source extent and an address of the data moved from the source extent in the target storage device; and
processing an access request for data in the storage system on the basis of the updated address mapping.

16. The apparatus of claim 15, wherein the acts further comprising:
selecting a further storage device from at least one storage devices as the target storage device.

17. A computer program product having a non-transitory computer readable medium which stores a set of instructions to manage a storage system; the set of instructions, when carried out by computerized circuitry, causing the computerized circuitry to perform a method of:
selecting a target storage device from multiple storage devices associated with the storage system in response to a respective wear degree of each one of the multiple storage devices being higher than a first predetermined threshold, wherein selecting the target storage device from the multiple storage devices comprises selecting a storage device having a highest wear degree among the multiple storage devices as the target storage device;
regarding multiple extents in storage devices in the multiple storage devices other than the target storage device, determining a respective access load of each individual one of the multiple extents at least in part based on a frequency at which writes were performed to each one of the extents over a past period of time;

selecting a source extent from multiple extents residing on the storage devices in the multiple storage devices other than the target storage device, on the basis of the respective access loads of the individual ones of the multiple extents; and moving data in the source extent to the target storage device, wherein moving data in the source extent to the target storage device comprises: in response to no free extent existing in the target storage device, determining access loads of multiple extents in the target storage device, selecting, from among the multiple extents in the target storage device, a destination extent having i) a lowest access load among the multiple extents in the target storage device, and ii) an access load that is lower than an access load of the source extent, and swapping data in the source extent and the destination extent.

18. The method of claim 1, wherein the first threshold comprises a wear degree indicating that a corresponding storage device is about to reach an end of life, and further comprising:

migrating data in each extent in the target storage device to a backup storage device in response to a wear degree corresponding to the target storage device exceeding a second threshold; and wherein the first threshold is lower than the second threshold.

19. The method of claim 1, further comprising:

in response to respective wear degrees of all the storage devices in the multiple storage devices being similar, selecting the target storage device randomly from the multiple storage devices.

20. The method of claim 1, wherein moving data in the source extent to the target storage device further comprises: further in response to no free extent existing in the target storage device, determining whether any extent among the multiple extents in the target storage device has an access load that is lower than the access load of the source extent, and in response to determining that no extent among the multiple extents in the target storage device has an access load that is lower than the access load of the source extent, terminating without moving any data in the source extent to the target storage device.

* * * * *